(12) United States Patent
Kaneko et al.

(10) Patent No.: US 8,914,177 B2
(45) Date of Patent: Dec. 16, 2014

(54) HYBRID WHEEL LOADER

(75) Inventors: Satoru Kaneko, Naka (JP); Takashi Ikimi, Hitachi (JP); Hidekazu Moriki, Hitachinaka (JP); Noritaka Ito, Ushiku (JP); Hiroaki Yanagimoto, Kasumigaura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 62 days.

(21) Appl. No.: 13/817,538

(22) PCT Filed: Aug. 19, 2011

(86) PCT No.: PCT/JP2011/068789
§ 371 (c)(1),
(2), (4) Date: Feb. 19, 2013

(87) PCT Pub. No.: WO2012/035929
PCT Pub. Date: Mar. 22, 2012

(65) Prior Publication Data
US 2013/0151055 A1     Jun. 13, 2013

(30) Foreign Application Priority Data
Sep. 17, 2010   (JP) .................. 2010-209464

(51) Int. Cl.
*B60L 9/00*     (2006.01)
*B60W 10/26*    (2006.01)
*B60W 20/00*    (2006.01)
*E02F 9/20*     (2006.01)

(52) U.S. Cl.
CPC ............... *B60W 10/26* (2013.01); *B60W 20/00* (2013.01); *E02F 9/2075* (2013.01); *E02F 9/2091* (2013.01); *B60Y 2200/415* (2013.01); *B60Y 2400/114* (2013.01); *Y10S 903/907* (2013.01)
USPC ..... 701/22; 701/50; 180/65.245; 180/65.275; 903/907

(58) Field of Classification Search
CPC .................. B60Y 2200/415; B60Y 2400/114; B60W 2300/17; B60W 20/00; B60W 10/26; E02F 9/2075; E02F 9/2091; Y10S 903/907
USPC .................... 701/22, 50; 180/65.245, 65.275; 903/907
See application file for complete search history.

(56) References Cited

U.S. PATENT DOCUMENTS 5,573,365 A * 11/1996 Michalski ................ 414/416.09
5,787,787 A *  8/1998 Kim et al. .................... 91/361

(Continued)

FOREIGN PATENT DOCUMENTS

| JP | 2000-226183 | 5/2000 |
| JP | 2009-74407 | 4/2009 |
| JP | 2010-30559 | 2/2010 |
| JP | 2010-030599 | 2/2010 |

*Primary Examiner* — Gertrude Arthur Jeanglaude
(74) *Attorney, Agent, or Firm* — Antonelli, Terry, Stout & Kraus, LLP.

(57) ABSTRACT

[Problem] To provide a hybrid wheel loader capable of highly efficient and stable supply of motive power.
[Solution] A hybrid wheel loader including: a front work machine (5) provided at the front of a vehicle; power sources including an engine (1) and an electric storage device; and a hybrid control device (20) which controls output of these power sources; characterized in that: a capacitor (11) is provided as the electric storage device; and the hybrid control device makes control to decrease a voltage of the capacitor in accordance with increase of energy held by the vehicle.

7 Claims, 6 Drawing Sheets (56) References Cited

U.S. PATENT DOCUMENTS

| 7,900,722 | B2 * | 3/2011 | Shimada et al. | 180/6.48 |
| 7,950,481 | B2 * | 5/2011 | Betz et al. | 180/65.31 |
| 8,087,900 | B2 * | 1/2012 | Mackin et al. | 417/212 |
| 8,474,560 | B1 * | 7/2013 | Konz et al. | 180/68.5 |
| 2007/0080236 | A1 * | 4/2007 | Betz et al. | 237/12.1 |
| 2010/0293912 | A1 * | 11/2010 | Mackin et al. | 56/10.2 R |
| 2011/0295453 | A1 * | 12/2011 | Betz et al. | 701/22 |

* cited by examiner

HYBRID WHEEL LOADER

TECHNICAL FIELD

The present invention relates to a hybrid wheel loader. Particularly, it is suitable for controlling the output of a capacitor as an electric storage device.

BACKGROUND ART

In recent years, an energy saving trend on industrial products has been strong in view of environmental problem, rise of crude oil price, etc. The field of construction vehicles, work vehicles, etc. in which hydraulic drive systems using Diesel engines have heretofore played a central role is also on the same trend so that there has been an increasing number of instances using electrification to increase efficiency and improve energy saving.

When, for example, a drive portion of a vehicle is electrified, that is, a drive source thereof is set as an electric motor, lots of energy saving effects such as engine's high efficiency drive (hybrid model), improvement in power transmission efficiency, recovery of regenerative electric power, etc. in addition to reduction of exhaust gas can be expected. In the aforementioned field of construction vehicles, work vehicles, etc., electrification of forklifts has been most advanced, and "electric-powered forklifts" in which motors are driven using electric power of batteries have taken the lead ahead of other vehicles and have been put into practical use. Consecutively to this, "hybrid vehicles" using combination of Diesel engines and electric motors in hydraulic excavators, engine type forklifts etc. have recently started being produced.

Figure 8:
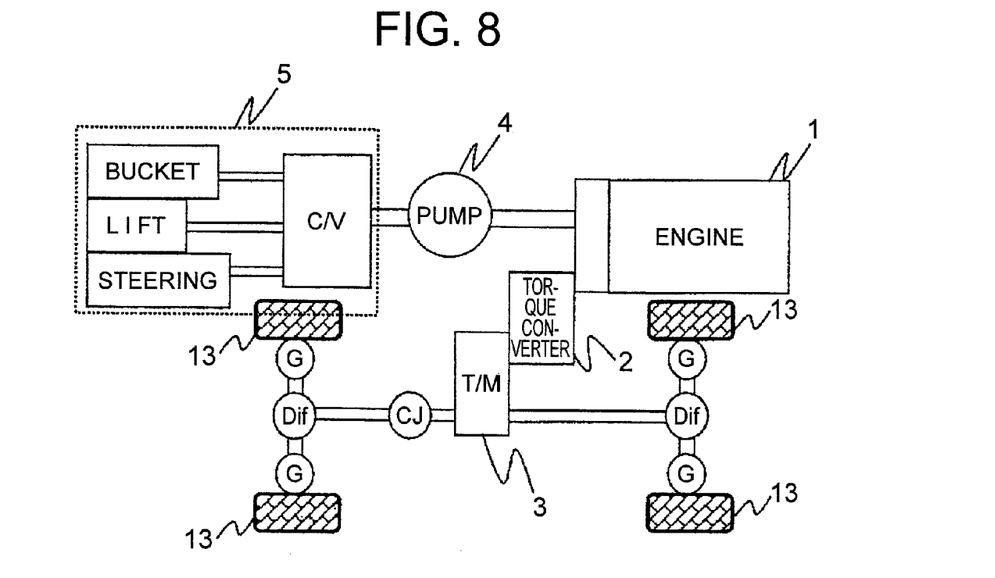
[FIG. 8] A view showing a configuration of a background-art drive system of a wheel loader as an example of a work vehicle.

Among these construction machines and work vehicles on the trend toward ecology and energy saving using electrification as described above, wheel loaders are vehicles which can be expected to have a comparatively large effect on reduction of fuel consumption when the vehicles are made hybrid. As shown in FIG. 8, a background-art wheel loader has a travel portion (wheel portion) and a front hydraulic work portion (lift/bucket portion) as main movable portions so that while motive power of an engine 1 is transmitted to tires 13 through a torque converter 2 and a transmission (T/M) 3 to make the vehicle travel, the hydraulic work device 5 in the vehicle front portion is driven by a hydraulic pump 4 so as to excavate and carry soil etc.

Power transmission efficiency of the torque converter used in the background art is inferior to power transmission efficiency based on electricity. When a travel drive portion of the aforementioned background-art wheel loader is electrified, power transmission efficiency from the engine can be therefore more improved. Further, since the wheel loader repeats travel start and stop operations frequently during work, it is expected to recover regenerative electric power at the time of braking from a drive motor when the travel portion is electrified. It is said that fuel consumption can be generally reduced by about a few tens of percent when part of the drive device of the current wheel loader is electrified and hybridized in this manner.

A method for controlling a hybrid system of such a work vehicle is, for example, shown in Patent Literature 1. This Patent Literature 1 has given disclosure about a system in which a control mode is selected in accordance with the noise level of a hybrid work vehicle. Specifically, as for a drive system in a low idle state of an engine, first, the engine is fixed to the low idle state while the shortage of a pump output obtained only by driving the engine is supplemented by an electric motor if necessary, so that a pump output set by a hand throttle can be obtained. Next, it is checked whether the electric motor is being driven or not, and a work machine is driven in accordance with an operation signal from a work machine lever when the electric motor is being driven.

On this occasion, when the electric motor is under suspension, the electric motor is driven at a fixed rotation speed so that the work machine can be driven by the engine and the electric motor. After that, the amount of charge in a battery is calculated, and it is determined whether the battery is empty or not based on the amount of charge. Then, when the battery is empty, a warning is outputted while the electric motor is suspended and the hydraulic pump is driven only by the low idle of the engine. The electric motor is suspended when no operation signal from the work machine lever is inputted, and the engine is suspended when the battery is full of charge. On the other hand, when the battery is not full of charge, the battery is charged by a generator.

In this manner, according to the technique described in Patent Literature 1, it is possible to achieve a low-noise drive system in which the engine is set in a low idle state or an idling stop state in accordance with the noise level of the vehicle.

CITATION LIST

Patent Literature

Patent Literature 1: JP-A-2000-226183

SUMMARY OF INVENTION

Technical Problem

In the aforementioned background-art technique described in Patent Literature 1, after the engine is set in a low idle state, the amount of charge in the battery is calculated, and it is determined whether the battery is empty or not based on the amount of charge. When the battery is empty, a warning is outputted while the electric motor is suspended and the hydraulic pump is driven only by the low idle of the engine. In such a case, a shortage in output may occur relatively to a motive power request of an operator when the battery is empty. It is therefore likely that it is difficult to drive the work machine at a satisfactory speed.

Further, the aforementioned background-art technique described in Patent Literature 1 has given description about hybrid models of rough terrain cranes and hydraulic excavators in its publication. However, the background-art technique cannot be always applied to other construction machines as it is. For example, of operation modes of the aforementioned wheel loader, there is a unique operation mode in which the vehicle in the low idle state (standby state) of the engine is fully accelerated while the front bucket portion is lifted up. When the wheel loader is driven only by the low idle of the engine in such a high-load operation mode as described in Patent Literature 1, it is likely that required operation performance cannot be obtained.

Therefore, an object of the invention is to provide a hybrid wheel loader capable of stable supply of motive power even in a high-load operation mode which is unique to the wheel loader and in which a vehicle in a standby state is fully accelerated.

Solution to Problem

In order to achieve the foregoing object, the invention provides a hybrid wheel loader including: a front work machine provided at the front of a vehicle; power sources including an engine and an electric storage device; and a hybrid control device which controls outputs of the power sources; characterized in that: a capacitor is provided as the electric storage device; and the hybrid control device makes control to decrease a voltage of the capacitor in accordance with increase of energy held by the vehicle. According to the invention, the voltage of the capacitor can be used in accordance with the energy held by the vehicle. Therefore, the engine and the capacitor can be used efficiently to drive the vehicle.

The "energy held by the vehicle" in the invention here means, for example, kinetic energy based on the traveling speed of the vehicle body. Alternatively, the "energy held by the vehicle" in the invention may be energy calculated as the total sum of potential energy based on the height of a bucket of the front work machine, rotational energy based on rotation speeds of the engine and the motor/generator, etc. in addition to the kinetic energy based on the traveling speed of the vehicle body. Alternatively, the "energy held by the vehicle" in the invention may be energy obtained by adding one of potential energy based on the height of a bucket of the front work machine and rotational energy based on rotation speeds of the engine and the motor/generator to the kinetic energy based on the traveling speed of the vehicle body.

That is, in the aforementioned configuration, it is preferable that the energy held by the vehicle consists of kinetic energy based on a traveling speed of a vehicle body, or energy obtained by adding at least one of potential energy based on height of a bucket of the front work machine and rotational energy based on rotation speeds of the engine and the motor/generator to the kinetic energy.

Figure 7:
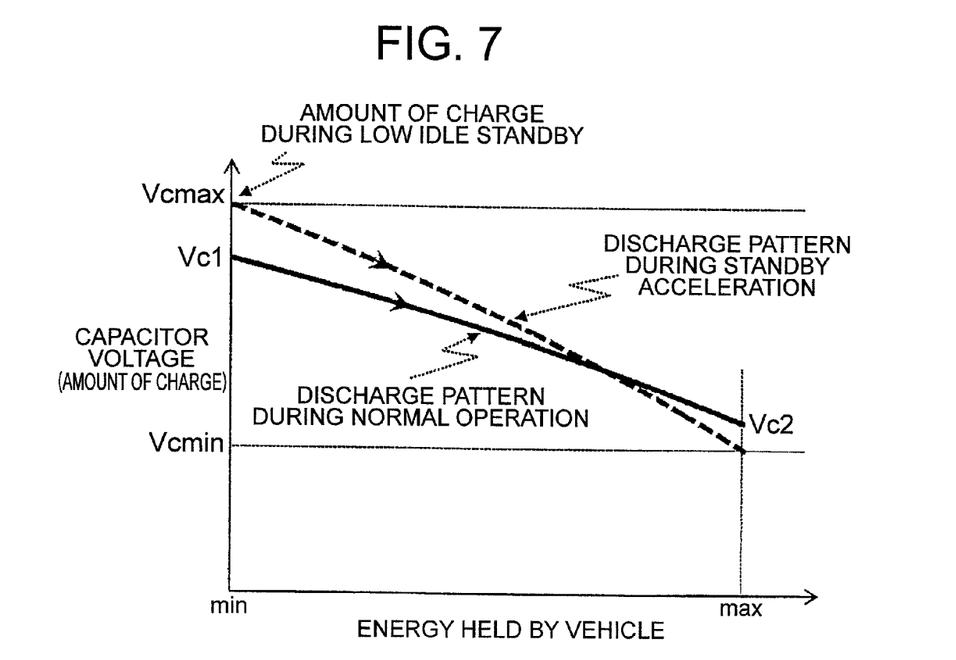
[FIG. 7] A view showing a charge/discharge pattern of a capacitor in accordance with the operation of a hybrid wheel loader.

In addition, in the aforementioned configuration, it is preferable that the hybrid control device makes control to obtain different characteristics in the voltage of the capacitor relative to the energy held by the vehicle between a normal operation mode in which normal work operation is carried out and a vehicle standby mode in which the vehicle is kept standby, while making control to set the voltage of the capacitor at a first specific voltage value (e.g. corresponding to Vc1 in FIG. 7) which is lower than a maximum service voltage value (e.g. corresponding to Vcmax in FIG. 7) and higher than a minimum service voltage value (e.g. corresponding to Vcmin in FIG. 7) when the energy held by the vehicle takes a predetermined low output value (e.g. corresponding to energy min (minimum value) held by the vehicle in FIG. 7) in the normal operation mode; and when the state in which the energy held by the vehicle takes the low output value is continued for a predetermined period of time, the hybrid control device makes control to rise the voltage of the capacitor from the first specific voltage value to the maximum service voltage value, and to then decrease the rotation speed of the engine to a rotation speed in an idle state to thereby bring the vehicle into the vehicle standby mode.

According to this configuration, the voltage of the capacitor is increased to the maximum service voltage value in the state where the vehicle is standby, so that stable power can be supplied from the capacitor even in a high-load operation mode which is unique to the wheel loader and in which the vehicle in the standby state is fully accelerated.

There is a case where a sufficient output cannot be obtained if the vehicle starts suddenly in the middle of control to decrease the rotation speed of the engine to the rotation speed corresponding to the idle state while increasing the voltage of the capacitor from the first specific voltage value to the maximum service voltage value. According to the invention, however, the rotation speed of the engine is decreased to the rotation speed corresponding to the idle state after the voltage of the capacitor increases to the maximum service voltage value. It is therefore possible to obtain a sufficient output even when the vehicle starts suddenly.

In addition, in the aforementioned configuration, it is preferable that the hybrid control device makes control in the normal operation mode to decrease the voltage of the capacitor from the first specific voltage value to a second specific voltage value (e.g. corresponding to Vc2 in FIG. 7), which is higher than the minimum service voltage value and lower than the first specific voltage value, in accordance with increase in the energy held by the vehicle, and makes control in the vehicle standby mode to decrease the voltage of the capacitor from the maximum service voltage value to the minimum service voltage value in accordance with increase in the energy held by the vehicle.

According to this configuration, voltage control on the capacitor corresponding to the vehicle standby mode is carried out in a high-load operation mode which is unique to the wheel loader and in which the vehicle in the standby state is fully accelerated. Thus, electric power is discharged from the capacitor aggressively in accordance with acceleration of the vehicle so as to assist the output of the engine. It is therefore possible to use all the electric power accumulated in the capacitor when the vehicle is fully accelerated.

In addition, in the normal operation mode, the engine already operates with a rotation speed expected during work, so that a sufficient output can be provided relatively to the motive power requested by the vehicle. It is therefore possible to avoid charging the capacitor with unnecessary power generation from the motor/generator due to the voltage control on the capacitor corresponding to the normal operation mode as in the invention. In addition, even when the vehicle speed rises after the acceleration, a sufficient output can be supplied from the engine. Thus, the electric power discharged from the capacitor can be left unchanged.

Advantageous Effects of Invention

According to the invention, it is possible to supply stable motive power with an optimal capacity of a capacitor even in such a high-load operation mode that a vehicle in a standby state is fully accelerated in a hybrid wheel loader having a travel drive device in which a part or the whole of motive power is covered by a hydraulic work device in a front portion and an electric motor.

DESCRIPTION OF EMBODIMENTS

Figure 1:
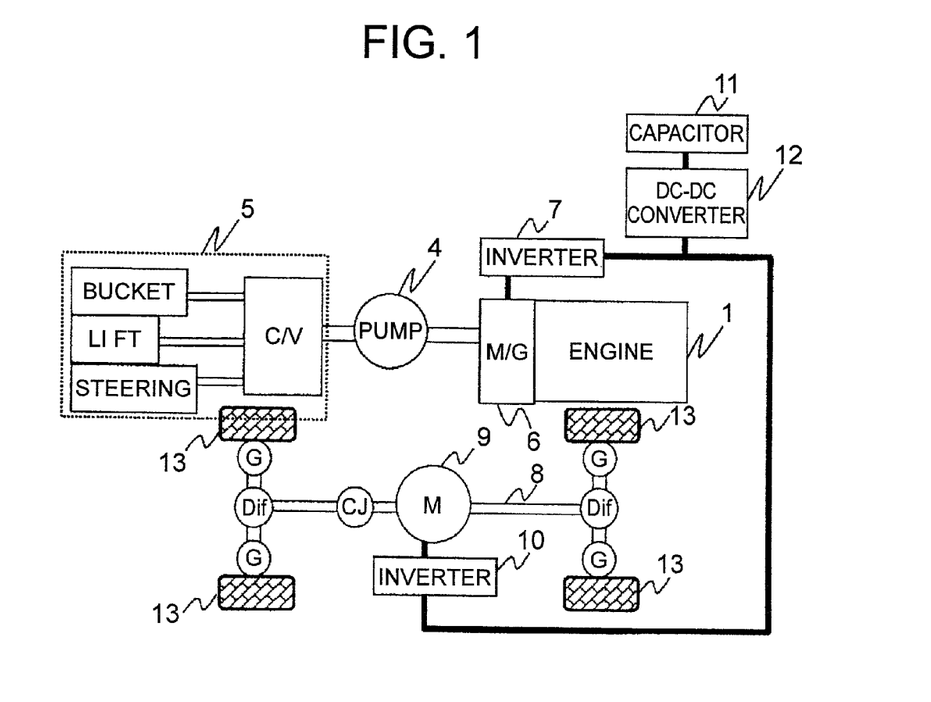
[FIG. 1] A view showing a configuration example of a hybrid system of a work vehicle.

A hybrid wheel loader according to an embodiment of the invention will be described below with reference to FIGS. 1 to 7. First, a system configuration example of the hybrid wheel loader according to the embodiment of the invention will be described with reference to FIG. 1. The configuration example shown in FIG. 1 is a configuration in which, of movable portions of the wheel loader, a travel portion is electrified. Specifically, the configuration is a series type hybrid system in which an M/G (motor/generator) 6 is mounted on the output shaft of an engine 1, an inverter 7 controls the M/G 6, a drive motor 9 is attached to a propeller shaft 8 of the travel portion, and an inverter 10 controls the drive motor 9. In addition, a capacitor 11 is electrically connected to the inverters 7 and 10 through a DC-DC converter 12 so that DC electric power can be supplied to and received from those electric power inverters. Particularly in this embodiment, an electric double layer capacitor 11 is used as an electric storage device. Buck-boost control on the capacitor voltage is carried out by the DC-DC converter 12 so that DC electric power can be supplied to and received from the inverters 7 and 10. In this manner, the engine 1 and the capacitor 11 serve as power sources in the hybrid wheel loader according to the embodiment.

In addition, the hybrid wheel loader shown in FIG. 1 has a hydraulic pump 4 which supplies oil to a hydraulic work device 5 of a front portion for carrying out work for excavating soil etc., so as to carry out work in accordance with an object, in the same manner as in the background-art wheel loader in FIG. 8. On the other hand, the traveling of the vehicle is mainly achieved by the drive motor 9 which rotationally drives tires 13 using electric power generated by the motor/generator (M/G) 6 based on the motive power of the engine 1. At that time, the capacitor 11 absorbs regenerative electric power during the braking of the vehicle or assists the output of the engine 1 so as to contribute to reduction in the energy consumption of the vehicle. The hybrid system the invention is aimed at is not limited to the configuration example of FIG. 1, but the invention is applicable to various hybrid configurations including a parallel type.

A hybrid control device 20 is mounted on the vehicle as a portion for controlling the aforementioned hybrid system. The hybrid control device 20 is a controller which controls total energy or power in the hybrid system shown in FIG. 1. In addition to the hybrid control device 20, a hydraulic control device 21 for controlling a hydraulic control valve (CV) or a hydraulic pump, an engine control device 22 for controlling the engine, an inverter control device 23 for controlling the inverters 7 and 10, and a converter control device 24 for controlling the DC-DC converter 12 are mounted on the vehicle. Those peripheral control devices are connected, for example, by use of CAN (Controller Area Network) communication or the like as shown in FIG. 2, so as to transmit and receive command values and state quantities of the respective devices to and from one another.

To really establish the vehicle, a monitor or a controller for an information system is required in addition to the peripheral control devices 21 to 24. However, those have no direct relation to the invention. Therefore, only the controllers required for controlling the respective driving parts of the hybrid system shown in FIG. 1 are shown in FIG. 2.

Figure 2:
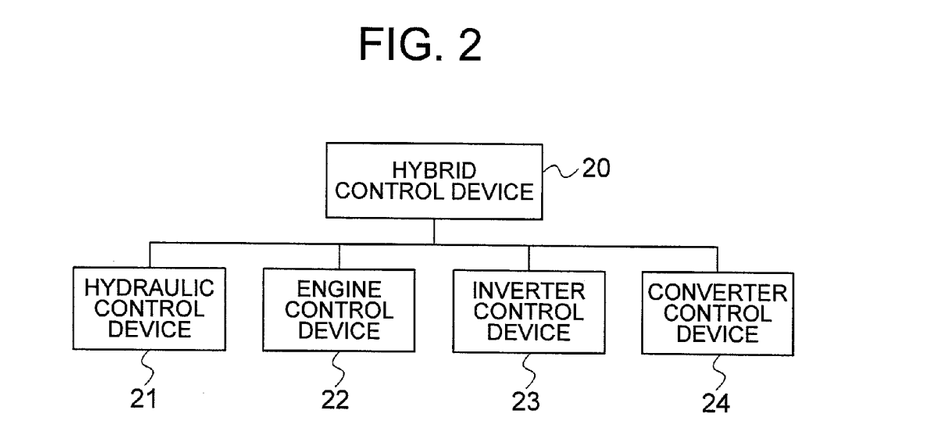
[FIG. 2] A view showing wire connections between a hybrid control device and peripheral control devices.

As shown in FIG. 2, the hybrid control device 20 is located as a host of the controllers including the hydraulic control device 21, the engine control device 22, the inverter control device 23 and the converter control device 24 so as to control the system as a whole. The hybrid control device 20 gives instructions of specific operations to the control devices 21 to 24 so that the system as a whole can exhibit the highest performance. Each control device is not always a separate body from the others as shown in FIG. 2, but two or more control functions may be mounted on one control device.

Figure 3:
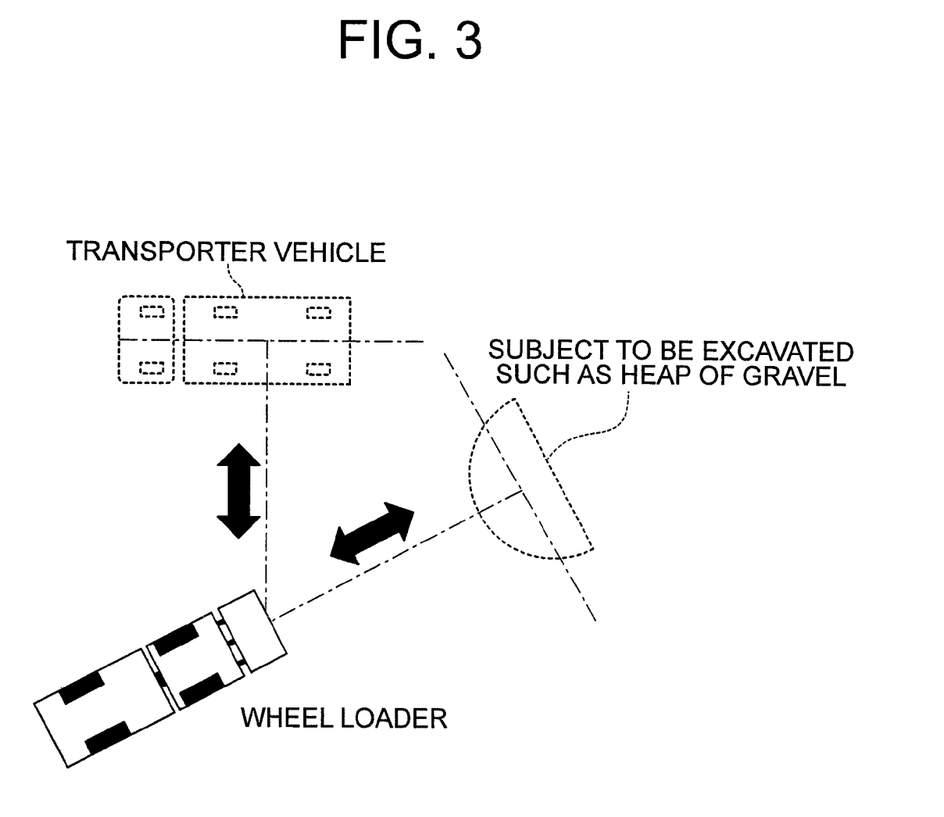
[FIG. 3] A view showing an example of a work pattern of a wheel loader.

In addition, there are some operation patterns in the wheel loader according to the embodiment. The hybrid control device 20 has to operate the vehicle optimally in accordance with the operation of the wheel loader. For example, a V-cycle excavating work shown in FIG. 3 is a typical work pattern. The V-cycle excavating work is a main operation pattern which accounts for at least about 70 percent of the total work of a real wheel loader. In the V-cycle excavating work, the wheel loader, first, moves ahead toward a subject to be excavated such as a heap of gravel, and loads materials to be transported such as gravel on a bucket which is shoved into the heap of gravel. After that, the wheel loader moves backward and returns to its initial position, and moves ahead toward a transporter vehicle such as a dump truck while operating steering and lifting up the front bucket portion. Then, after the materials to be transported have been loaded on the transporter vehicle, the wheel loader moves backward again and returns to the initial position. As in the aforementioned description, the wheel loader repeats the work while drawing a V-shape.

On this occasion, in the hybrid system shown in FIG. 1, regenerative electric power is generated from the drive motor 9 during braking operation occurring in each operation of moving forward/backward. Therefore, the regenerative electric power can be accumulated in the capacitor 11, and the regenerative electric power can be reused in the next motoring operation. In addition, in the V-cycle excavating work, the vehicle travels at a low speed of about 15 km/h at maximum, and repeats start and stop frequently. Thus, the transmission efficiency of motive power is not that high in a torque converter used in the background art. In contrast, the series type hybrid system as shown in FIG. 1 travels using an electric motor so that a significant amount of energy consumption can be reduced in the aforementioned manner.

As described above, when the wheel loader is made hybrid, it is possible to obtain a large fuel consumption improvement effect as to improvement of transmission efficiency and recovery of regenerative electric power in a travel portion in comparison with the background-art torque converter. Here, a secondary cell (battery) is mainly mounted as an electric storage device in a general hybrid automobile. Thus, the hybrid automobile has a comparatively large amount of electric energy and motive power allocation is performed between the secondary cell and an engine. However, problems of weight, cost, duration of life, etc. still remain in the secondary cell. Therefore, the secondary cell is not always an electric storage device that can be mounted on any hybrid automobile. For example, in a wheel loader the invention is aimed at, operation in which start and stop are repeated frequently accounts for a large part of the whole work contents. In such a model, a large-capacity capacitor such as an electric double layer capacitor may be suitable. In the embodiment, therefore, the capacitor 11 is mounted as an electric storage device, and controlled so that the output of the capacitor 11 is suitable to real operation of the hybrid wheel loader.

On the other hand, operation that requires assist of electric power the most in the hybrid wheel loader can be regarded as composite operation in the standby state of the vehicle. In a specific operation thereof, after the engine is set in a low idle (standby) state, the vehicle is fully accelerated while the front hydraulic work portion (lift/bucket) is lifted up from the lowest position, and the vehicle is kept travelling up to 10 km/h or more. In the initial state in such a vehicle accelerating operation, in the low idle state of the engine, the vehicle is fully accelerated while the bucket and lift in the front portion are lifted up. Therefore, high motive power is required, and the engine is always in a maximum output state. In this manner, the full acceleration operation in the low idle state of the engine imposes a heavy burden to the engine in comparison with the aforementioned fundamental V-cycle excavating work.

In addition, in the hybrid system, generally, the engine may be replaced by a small one in comparison with a background-art mounted engine. This is aimed at using an efficient small engine to improve fuel consumption. It is, however, considered that simple miniaturization of the engine leads to shortage in output of the engine, with the result that the drive performance of the vehicle deteriorates and the engine stalls in the worst case.

Therefore, in the hybrid wheel loader according to the embodiment, the motor/generator (M/G) 6 and the large-capacity capacitor 11 mounted newly assist the output of the engine 1 so as to achieve output performance as high as or higher than that in the background-art wheel loader. In the aforementioned V-cycle excavating work which is a normal fundamental work operation, the engine 1 operates with a rotation speed close to its rated speed from the beginning so that high motive power can be outputted from the engine 1, and the work is performed in such a limited range that the wheel loader comes and goes between a subject to be excavated such as soil and a transporter vehicle such as a dump truck. Thus, the motive power requested by the vehicle is smaller than that in the aforementioned "full acceleration operation in the low idle state". It can be therefore said that the largest amount of electric energy for the electric output assist in the hybrid system is used in the "full acceleration operation in the low idle state".

In the embodiment in which the large-capacity capacitor 11 is assumed as an electric storage device, it is considered that when the motive power requested by the vehicle is covered by the accumulated electric power directly for such work contents, the output of the capacitor 11 reaches a lower limit value of its service voltage soon. In the hybrid control device 20, therefore, efficient control over the output from the capacitor 11 is required while such an over-discharge state of the capacitor 11 is avoided.

To achieve the most suitable capacitor control system to the hybrid wheel loader, first, the hybrid control device 20 must grasp the current operation mode of the vehicle. When the hybrid control device 20 can recognize the vehicle operation that is being carried out currently or that will be carried out, the amount of electric power to be outputted from the capacitor 11 can be decided in consideration of the current charge state of the capacitor 11 and the rotational acceleration state of the engine 1. That is, it can be said that it will go well if control is made to change the charge/discharge pattern of the capacitor 11 in accordance with each operation mode.

Figure 4:
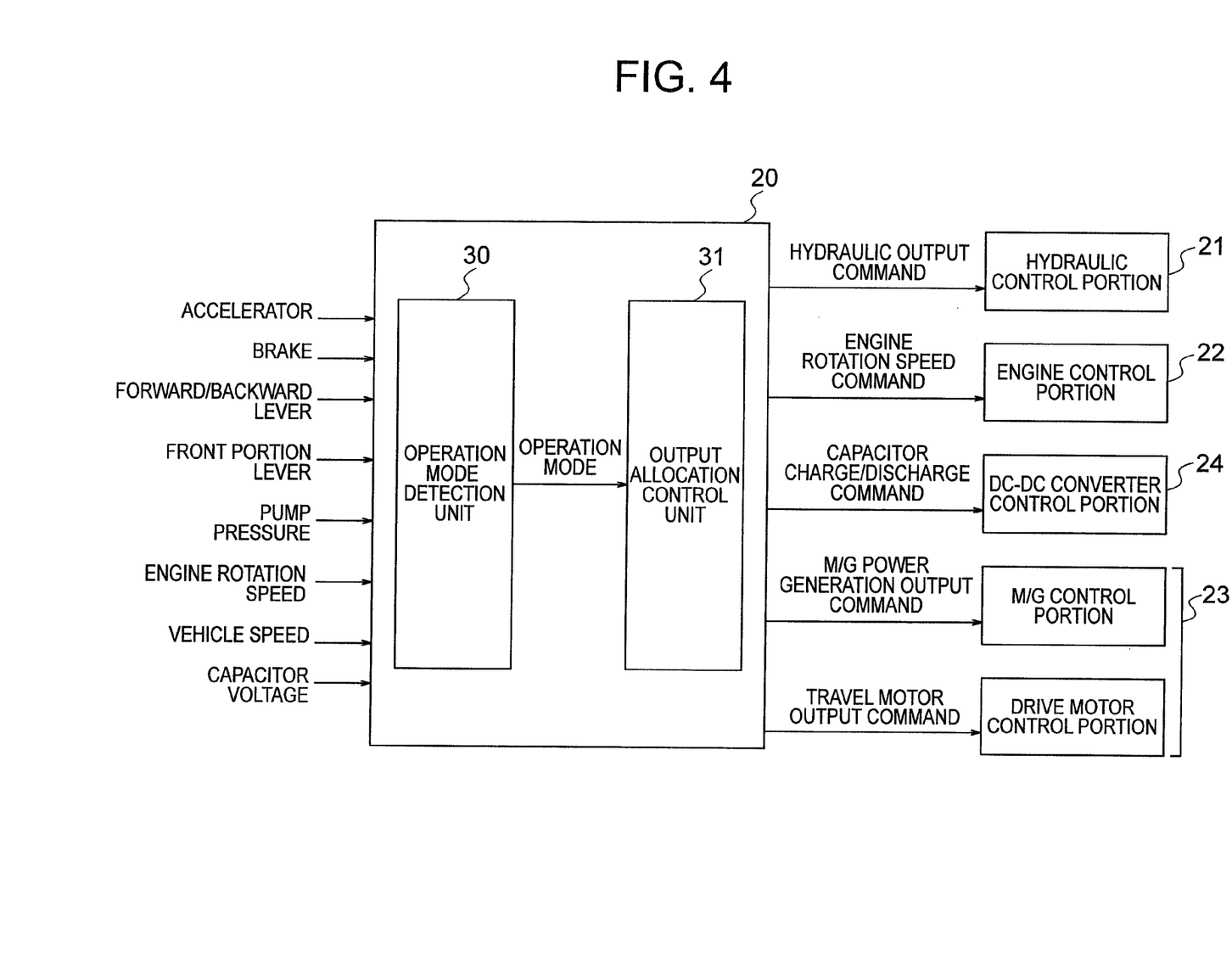
[FIG. 4] A view showing an example of a control configuration in the hybrid control device.

To achieve this control, first, the hybrid control device 20 has an operation mode detection unit 30 shown in FIG. 4, so that the current operation contents of the vehicle can be grasped by the operation mode detection unit 30. An example of processing in the operation mode detection unit 30 is shown in the flow chart of FIG. 5. In this embodiment, operation modes concerned with the charge/discharge control of the capacitor 11 are roughly classified to two kinds including a "vehicle standby mode" and a "normal operation mode". A method for detecting each operation mode will be shown below.

Figure 5:
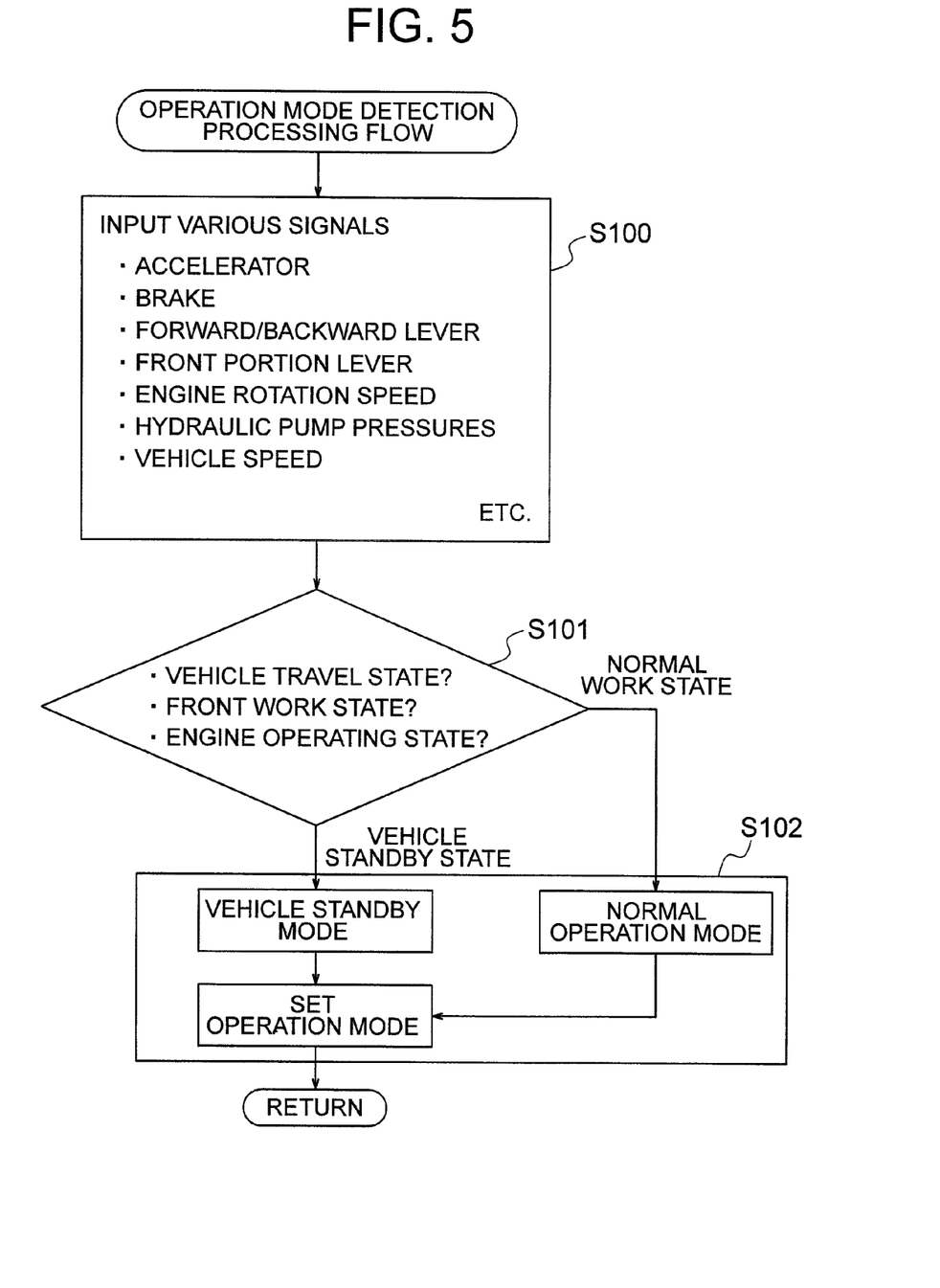
[FIG. 5] A flow chart showing processing for detecting an operation mode.

First, the operation mode detection unit 30 receives various vehicle command values (lever operations of an accelerator, a brake, a forward/backward lever, and a front work portion) and state quantities (hydraulic pump pressures, engine rotation speed, vehicle speed, etc.) in Step S100, and decides an operation mode in Step S101. For example, in Step S101, it is determined whether the vehicle is in a normal work state or the vehicle does not engage in any work but is in a vehicle standby state, based on the states obtained in Step S100.

Specifically, during the aforementioned V-cycle excavating work, any one of the aforementioned various command signals indicates an operation command state, or the engine, each hydraulic pump or the vehicle speed indicates the state that the vehicle is at work. Therefore, the operation mode detection unit 30 determines the current operation mode as the "normal operation mode". On the other hand, in the vehicle standby state, first, the engine rotation speed has dropped down to the low idle rotation speed. Further, any various command signals are not received in the standby state. On this occasion, the operation mode detection unit 30 regards the vehicle as in the standby state, and determines the operation mode as the "vehicle standby mode".

In this manner, the current operation mode of the vehicle concerned with the charge/discharge of the capacitor can be determined by the combination of input values of various signals. In this embodiment, description has been made as the operation modes of the vehicle roughly classified into the normal operation mode and the vehicle standby mode are detected. However, in order to change the charge/discharge pattern of the capacitor 11 in accordance with the other operation modes, a detection processing logic may be added into the flow chart of FIG. 5.

Further, in the hybrid control device 20, an output allocation control unit 31 decides the charge/discharge output of the capacitor 11 in accordance with the detected operation mode. Specifically, the hybrid control device 20 controls the output of the capacitor 11 so as to establish a charge/discharge pattern as shown in FIG. 7 in accordance with the operation mode of the vehicle. Here, FIG. 7 shows the charge/discharge pattern of the capacitor 11 in accordance with the operation of the vehicle, in which the abscissa designates the energy held by the vehicle, and the ordinate designates the voltage (corresponding to the amount of charge) of the capacitor 11. Although kinetic energy based on the traveling speed of the vehicle body is used as the energy held by the vehicle in the abscissa in this embodiment, energy obtained by adding one or both of potential energy based on the height of the bucket of the hydraulic work device (front work machine) 5 and rotational energy based on the rotation speeds of the engine 1 and the motor/generator 6 to the kinetic energy based on the traveling speed of the vehicle may be used as the energy held by the vehicle. For example, in this embodiment, a series type hybrid system in which the travel portion is replaced by an electric motor is assumed. In such a case, the vehicle speed serves as the most suitable parameter in the abscissa.

As shown in FIG. 7, the charge/discharge pattern of the capacitor in this embodiment behaves to decrease the amount of charge (increase the amount of discharge) in accordance with the energy held by the vehicle (vehicle traveling speed). In this manner, a free space for absorbing regenerative energy generated due to electric braking in the high vehicle speed can be secured in the capacitor 11. As a result, the regenerative energy can be used effectively, so that energy saving can be achieved in the hybrid wheel loader.

Here, in this embodiment, as shown in FIG. 7, it is assumed that the capacitor 11 takes different charge/discharge patterns (voltage characteristics of the capacitor relative to the energy held by the vehicle) between the normal operation mode and the vehicle standby mode. This is set to control the capacitor 11 optimally in accordance with the operation mode of the vehicle. For example, in the discharge pattern during the normal operation shown by the solid line in FIG. 7, the vehicle is stopped without setting the capacitor 11 in the full charge state even when the vehicle speed is zero, that is, the vehicle stops. That is, during the stoppage of the vehicle, the capacitor voltage takes a first specific voltage value Vc1 which is lower than a maximum service voltage value Vcmax. This is to avoid charging the capacitor with unnecessary electric power generated by the motor/generator (M/G) 6 because the engine already operates with a rotation speed expected during work in the normal operation mode so that a sufficient output can be provided relatively to the motive power requested by the vehicle. Even when the vehicle speed rises after the acceleration, a sufficient output can be supplied from the engine. Thus, the electric power discharged from the capacitor can be left unchanged.

In this discharge pattern during the normal operation, the voltage of the capacitor 11 takes a second specific voltage value Vc2 (Vc1>Vc2) which is larger than a minimum service voltage value Vcmin, when the energy held by the vehicle is maximum (Max). That is, the output of the capacitor 11 still has some margin though the energy held by the vehicle is the maximum. In this manner, in the normal operation mode, the charge/discharge of the capacitor 11 is controlled in accordance with the discharge pattern during the normal operation.

On the other hand, in the discharge pattern during the standby acceleration shown by the broken line in FIG. 7, the capacitor 11 is set in a full charge state (the state in which the capacitor voltage is the maximum service voltage Vcmax) during the stoppage of the vehicle (the engine 1 is in the low idle state because the vehicle is in the standby state). This is because a large output corresponding to the requested motive power cannot be extracted from the engine because the engine is in the low idle state as described above, but especially large motive power is required for acceleration in the stop state of the vehicle, particularly for acceleration while the hydraulic work device 5 of the front portion is operated. In such a case, the output of the engine 1 is assisted as much as possible by electric power from the capacitor 11.

Thus, in the discharge pattern during the standby acceleration (the broken line in FIG. 7), the full charge state is established during the stop state of the vehicle (the state in which the energy held by the vehicle is the minimum), so that electric power can be discharged from the capacitor 11 aggressively in accordance with acceleration of the vehicle so as to assist the output of the engine 1. Thus, when the vehicle is accelerated to the maximum, the voltage of the capacitor 11 is decreased to the minimum service voltage value Vcmin so that all the electric power accumulated in the capacitor 11 can be used. In this manner, it can be said that the discharge pattern during the standby acceleration is a charge/discharge control pattern of the capacitor 11 corresponding to the vehicle standby mode, or a charge/discharge control pattern of the capacitor 11 in anticipation of the case where the vehicle makes "full acceleration operation in the low idle state".

Figure 6:
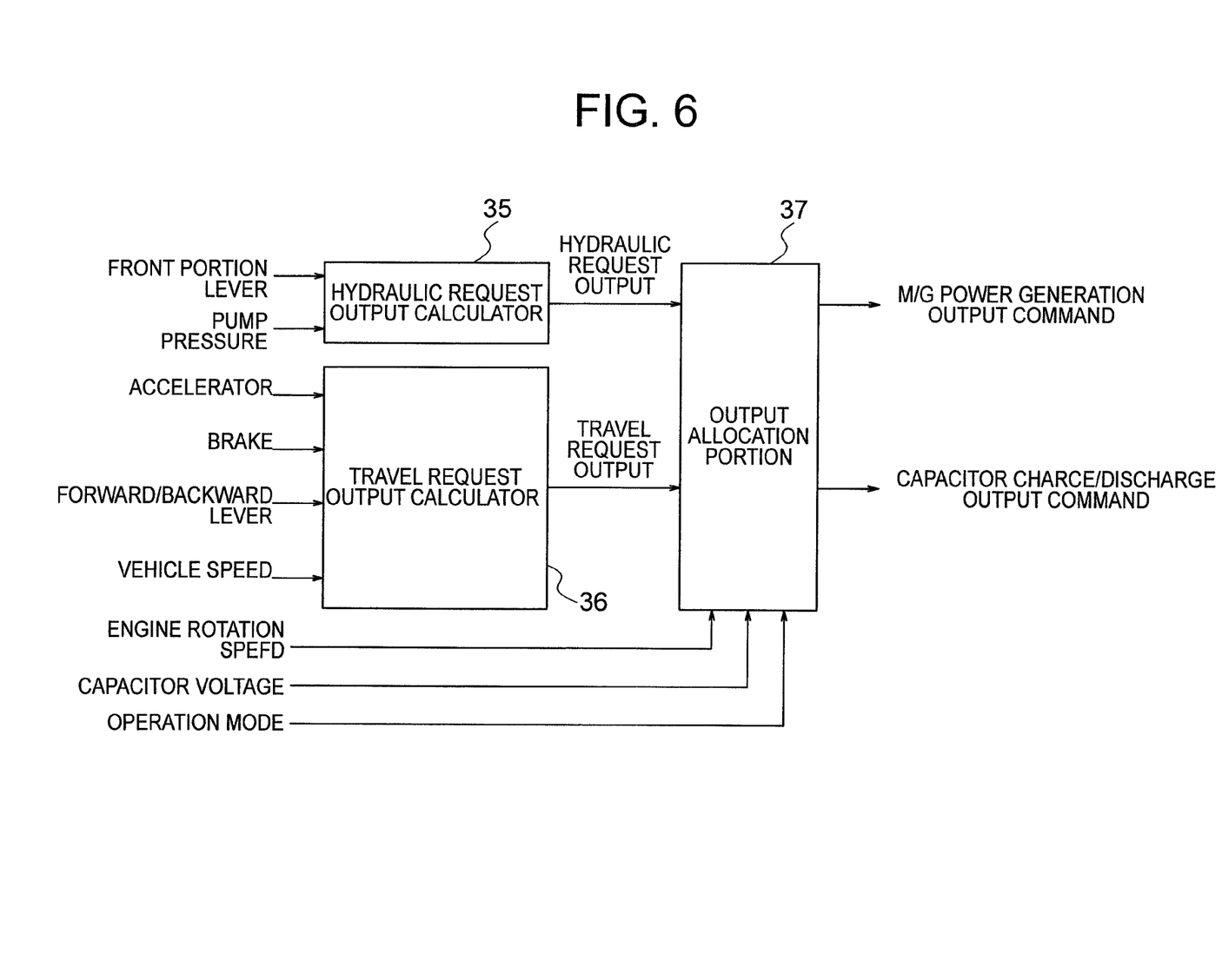
[FIG. 6] A block diagram showing a configuration of an output allocation control unit.

On this occasion, the output allocation control unit 31 shown in FIG. 4 controls the amount of charge/discharge of the capacitor 11. Processing of the output allocation control unit 31 is shown in the block diagram of FIG. 6. The output allocation control unit 31 first inputs various signals as shown in FIG. 6 to a hydraulic request output calculator 35 and a travel request output calculator 36 so as to calculate outputs currently required for work by the vehicle. The total sum of the hydraulic request output and the travel request output calculated here substantially corresponds to the total output requested by the vehicle. Further, a command for the M/G output generated by the motive power of the engine and a command for the charge/discharge output from the capacitor 11 are calculated by an output allocation portion 37 based on the calculated hydraulic request output, the calculated travel request output, the engine rotation speed, the capacitor voltage (the calculated current amount of charge) and the operation mode. Fundamentally the current maximum output of the engine 1 can be grasped from the input of the engine rotation speed. Therefore, calculation is made so that the capacitor 11 can discharge electric power correspondingly to the shortage relative to the total output requested by the vehicle.

Here, when the detection value of the operation mode described previously is used, the capacitor 11 can be charged in advance so as to accumulate capacitor electric power required for acceleration in the low idle state of the engine 1, or generative electric power generated by the normal work operation can be accumulated, or further the electric power discharged from the capacitor 11 can be increased at the operation point in which the efficiency of the engine 1 deteriorates. In such a manner, it is possible to exert an effect of improvement in fuel consumption in the hybrid wheel loader.

In addition, when the energy held by the vehicle takes a minimum value (predetermined low output value) in the normal operation mode, the output allocation control unit 31 makes control to set the voltage of the capacitor 11 at a voltage value Vc1 (first specific voltage value) which is lower than the maximum service voltage value Vcmax and higher than the minimum service voltage value Vcmin. Then, when the state where the energy held by the vehicle takes the minimum value is continued for a predetermined period of time, the output allocation control unit 31 makes control to increase the voltage of the capacitor 11 from the voltage value Vc1 to the maximum service voltage value Vcmax.

After the voltage of the capacitor 11 reaches the maximum service voltage value Vcmax, that is, after the capacitor 11 is brought into a full charge state, the hybrid control device 20 decreases the rotation speed of the engine 1 to the rotation speed in the idle state and moves to the vehicle standby mode. Thus, even in a high-load operation mode such as the case where the vehicle in the standby state is fully accelerated, stable motive power can be supplied from the capacitor 11.

In addition, in the aforementioned embodiment, operation modes are roughly classified into the "normal operation mode" corresponding to the V-cycle excavating work and the vehicle standby mode corresponding to the standby state of the vehicle (particularly the state preparing for the operation in which the vehicle in the low idle state is fully accelerated). However, in the real operation, it can be considered that the normal operation mode includes another operation mode such as a "high-speed transport travel mode (corresponding to a low-frequency operation mode in the invention)". Such an operation mode can be regarded as a mode which appears less frequently than the normal operation mode and which does not need motive power in comparison with the state in which the vehicle in the low idle state is fully accelerated in the vehicle standby mode. On this occasion, for example, control may be made to prevent the capacitor 11 from outputting/inputting electric power too much.

As described above, according to the hybrid wheel loader according to the embodiment of the invention, the charge/discharge pattern of the capacitor 11 is changed/controlled in accordance with each operation mode, so that shortage in the output of the engine during the acceleration of the vehicle in the standby state can be avoided to achieve a smooth operation in the vehicle. In addition, according to the hybrid wheel loader according to the embodiment of the invention, optimum power assist can be achieved in accordance with each operation mode, so that the mounted capacity of the capacitor 11 can be set optimally, with the result that the vehicle can be miniaturized and the cost can be reduced.

Reference Signs List

1 . . . engine, 2 . . . torque converter, 3 . . . transmission, 4 . . . hydraulic pump, 5 . . . hydraulic work device (front work machine), 6 . . . motor/generator, 7 . . . inverter, 8 . . . propeller shaft, 9 . . . drive motor, 10 . . . inverter, 11 . . . capacitor (electric storage device), 12 . . . DC-DC converter, 13 . . . tire, 20 . . . hybrid control device, 21-24 . . . peripheral control device, 30 . . . operation mode detection unit, 31 . . . output allocation control unit, 35 . . . hydraulic request output calculator, 36 . . . travel request output calculator, 37 . . . output allocation Portion

The invention claimed is:

1. A hybrid wheel loader comprising: a front work machine provided at the front of a vehicle; power sources including an engine, a motor/generator and an electric storage device; and s hybrid control device which controls outputs of the power sources; characterized in that:

a capacitor is provided as the electric storage device;

the hybrid control device makes control to decrease a voltage of the capacitor in accordance with increase of energy held by the vehicle; and the energy held by the vehicle consists of kinetic energy based on a traveling speed of a vehicle body, or energy obtained by adding at least one of potential energy based on height of a bucket of the front work machine and rotational energy based on rotation speeds of the engine and the motor/generator to the kinetic energy.

2. The hybrid wheel loader according to claim 1, characterized in that:

the hybrid control device makes control to obtain different characteristics in the voltage of the capacitor relative to the energy held by the vehicle between a normal operation mode in which normal work operation is carried out and a vehicle standby mode in which the vehicle is kept standby.

3. The hybrid wheel loader according to claim 2, characterized in that:

the hybrid control device makes control to set the voltage of the capacitor at a first specific voltage value which is lower than a maximum service voltage value and higher than a minimum service voltage value when the energy held by the vehicle takes a predetermined low output value in the normal operation mode; and when the state in which the energy held by the vehicle takes the predetermined low output value is continued for a predetermined period of time, the hybrid control device makes control to rise the voltage of the capacitor from the first specific voltage value to the maximum service voltage value, and to then decrease the rotation speed of the engine to a rotation speed in an idle state to thereby bring the vehicle into the vehicle standby mode.

4. The hybrid wheel loader according to claim 3, characterized in that:

the hybrid control device makes control in the normal operation mode to decrease the voltage of the capacitor from the first specific voltage value to a second specific voltage value, which is higher than the minimum service voltage value and lower than the first specific voltage value, in accordance with increase in the energy held by the vehicle, and makes control in the vehicle standby mode to decrease the voltage of the capacitor from the maximum service voltage value to the minimum service voltage value in accordance with increase in the energy held by the vehicle.

5. A hybrid wheel loader comprising: a front work machine provided at the front of a vehicle; power sources including an engine, a motor/generator and an electric storage device; and a hybrid control device which controls outputs of the power sources; characterized in that:

a capacitor is provided as the electric storage device;

the hybrid control device makes control to decrease a voltage of the capacitor in accordance with the increase of energy held by the vehicle; and the hybrid control device makes control to obtain different characteristics in the voltage of the capacitor relative to the energy held by the vehicle between a normal operation mode in which normal work operation is carried out and a vehicle standby mode in which the vehicle is kept standby.

6. The hybrid wheel loader according to claim 5, characterized in that: the hybrid control device makes control to set the voltage of the capacitor at a first specific voltage value which is lower than a maximum service voltage value and higher than a minimum service voltage value when the energy held by the vehicle takes a predetermined low output value in the normal operation mode; and when the state in which the energy held by the vehicle takes the predetermined low output value is continued for a predetermined period of time, the hybrid control device makes control to rise the voltage of the capacitor from the first specific voltage value to the maximum service voltage, and to then decrease the rotation speed of the engine to a rotation speed in an idle state to thereby bring the vehicle into the vehicle standby mode.

7. The hybrid wheel loader according to claim 6, characterized in that:

the hybrid control device makes control in the normal operation mode to decrease the voltage of the capacitor from the first specific voltage value to a second specific voltage value, which is higher than the minimum service voltage value and lower than the first specific voltage value, in accordance with increase in the energy held by the vehicle, and makes control in the vehicle standby mode to decrease the voltage of the capacitor from the maximum service voltage value to the minimum service voltage value in accordance with increase in the energy held by the vehicle.

* * * * *